United States Patent
Miller

(10) Patent No.: US 12,290,709 B2
(45) Date of Patent: May 6, 2025

(54) HIGH TEMPERATURE FLEXIBLE INSULATION FOR EXTREME ENVIRONMENTS

(71) Applicant: MILLER SCIENTIFIC INC., Flagstaff, AZ (US)

(72) Inventor: Stephen D. Miller, Flagstaff, AZ (US)

(73) Assignee: Sundance Management LLC, Sheridan, WY (US)

( * ) Notice: Subject to any disclaimer, the term of this patent is extended or adjusted under 35 U.S.C. 154(b) by 0 days.

(21) Appl. No.: 17/916,794

(22) PCT Filed: Jan. 10, 2022

(86) PCT No.: PCT/US2022/011870
§ 371 (c)(1),
(2) Date: Oct. 3, 2022

(87) PCT Pub. No.: WO2022/150727
PCT Pub. Date: Jul. 14, 2022

(65) Prior Publication Data
US 2023/0294379 A1    Sep. 21, 2023

Related U.S. Application Data

(60) Provisional application No. 63/298,168, filed on Jan. 10, 2022, provisional application No. 63/134,977, (Continued)

(51) Int. Cl.
*B32B 5/26* (2006.01)
*A62C 3/02* (2006.01)
(Continued)

(52) U.S. Cl.
CPC ............ *A62C 3/0257* (2013.01); *B32B 5/022* (2013.01); *B32B 5/024* (2013.01); *B32B 5/028* (2013.01);
(Continued)

(58) Field of Classification Search
CPC ....... A62C 3/0257; B32B 5/266; B32B 5/277; B32B 5/022; B32B 5/024; B32B 5/028;
(Continued)

(56) References Cited

U.S. PATENT DOCUMENTS

| 2004/0058608 A1 | 3/2004 | Heifetz |
| 2013/0115837 A1 | 5/2013 | Kitchen et al. |

(Continued)

FOREIGN PATENT DOCUMENTS

| EP | 1641895 B1 | 6/2009 | |
| EP | 3198069 B1 | 3/2019 | |
| WO | WO-2005003254 A1 * | 1/2005 | ............. C04B 26/00 |

OTHER PUBLICATIONS

WO-2005/003254 machine translation (Year: 2005).*
USPTO, International Search Report and Written Opinion on Patentability, PCT/US2022/011870, Apr. 11, 2022.

*Primary Examiner* — Vincent Tatesure
(74) *Attorney, Agent, or Firm* — Invention To Patent Services; Alex Hobson

(57) ABSTRACT

A flexible insulation material may be configured to substantially reduce the amount of radiation transmitted therethrough by incorporating a reflective mat of high temperature fibers that withstand temperatures of at least 500° C. The flexible insulation may be stored and used over temperatures ranging from −270° C. to 5000° C. The mat may have optical properties to produce a transmittance of no more than 5% over a range of temperature from 500° C. to 5000 vC. The mat may include high temperature fibers such as carbon and/or silicon carbide and these fibers may be coupled by a binder in a non-woven fabric. The flexible insulation material may be configured in the Flexible Thermal Protection System of a deployable aerodynamic decelerator or a Hypersonic Inflatable Aerodynamic Decelerator and may be durably flexible.

24 Claims, 9 Drawing Sheets

Related U.S. Application Data filed on Jan. 8, 2021, provisional application No. 63/134,975, filed on Jan. 8, 2021.

(51) Int. Cl.

| | |
|---|---|
| *B32B 5/02* | (2006.01) |
| *B32B 5/12* | (2006.01) |
| *D04H 1/413* | (2012.01) |
| *D04H 1/4209* | (2012.01) |
| *D04H 1/4242* | (2012.01) |
| *D04H 1/4374* | (2012.01) |
| *D04H 1/548* | (2012.01) |
| *B64G 1/62* | (2006.01) |

(52) U.S. Cl.
CPC ............... *B32B 5/12* (2013.01); *B32B 5/266* (2021.05); *B32B 5/277* (2021.05); *D04H 1/413* (2013.01); *D04H 1/4209* (2013.01); *D04H 1/4242* (2013.01); *D04H 1/4374* (2013.01); *D04H 1/548* (2013.01); *B32B 2250/20* (2013.01); *B32B 2255/02* (2013.01); *B32B 2255/20* (2013.01); *B32B 2255/205* (2013.01); *B32B 2262/02* (2013.01); *B32B 2262/0246* (2013.01); *B32B 2262/0253* (2013.01); *B32B 2262/10* (2013.01); *B32B 2262/101* (2013.01); *B32B 2262/105* (2013.01); *B32B 2262/106* (2013.01); *B32B 2262/144* (2021.05); *B32B 2262/16* (2021.05); *B32B 2264/1022* (2020.08); *B32B 2266/126* (2016.11); *B32B 2307/304* (2013.01); *B32B 2307/306* (2013.01); *B32B 2307/3065* (2013.01); *B32B 2307/546* (2013.01); *B32B 2307/552* (2013.01); *B32B 2307/738* (2013.01); *B32B 2437/00* (2013.01); *B32B 2439/70* (2013.01); *B32B 2571/00* (2013.01); *B32B 2605/18* (2013.01); *B64G 1/62* (2013.01)

(58) Field of Classification Search
CPC ........ B32B 5/12; D04H 1/413; D04H 1/4209; D04H 1/4242; D04H 1/4374; D04H 1/548
USPC ............................................................ 442/2
See application file for complete search history.

(56) References Cited

U.S. PATENT DOCUMENTS

| | | |
|---|---|---|
| 2014/0273701 A1 | 9/2014 | Samanta et al. |
| 2014/0287641 A1* | 9/2014 | Steiner, III ............... B32B 5/26 428/317.1 |
| 2017/0190628 A1* | 7/2017 | Easter .................... C04B 35/76 |
| 2018/0084853 A1 | 3/2018 | Markesbery et al. |

* cited by examiner

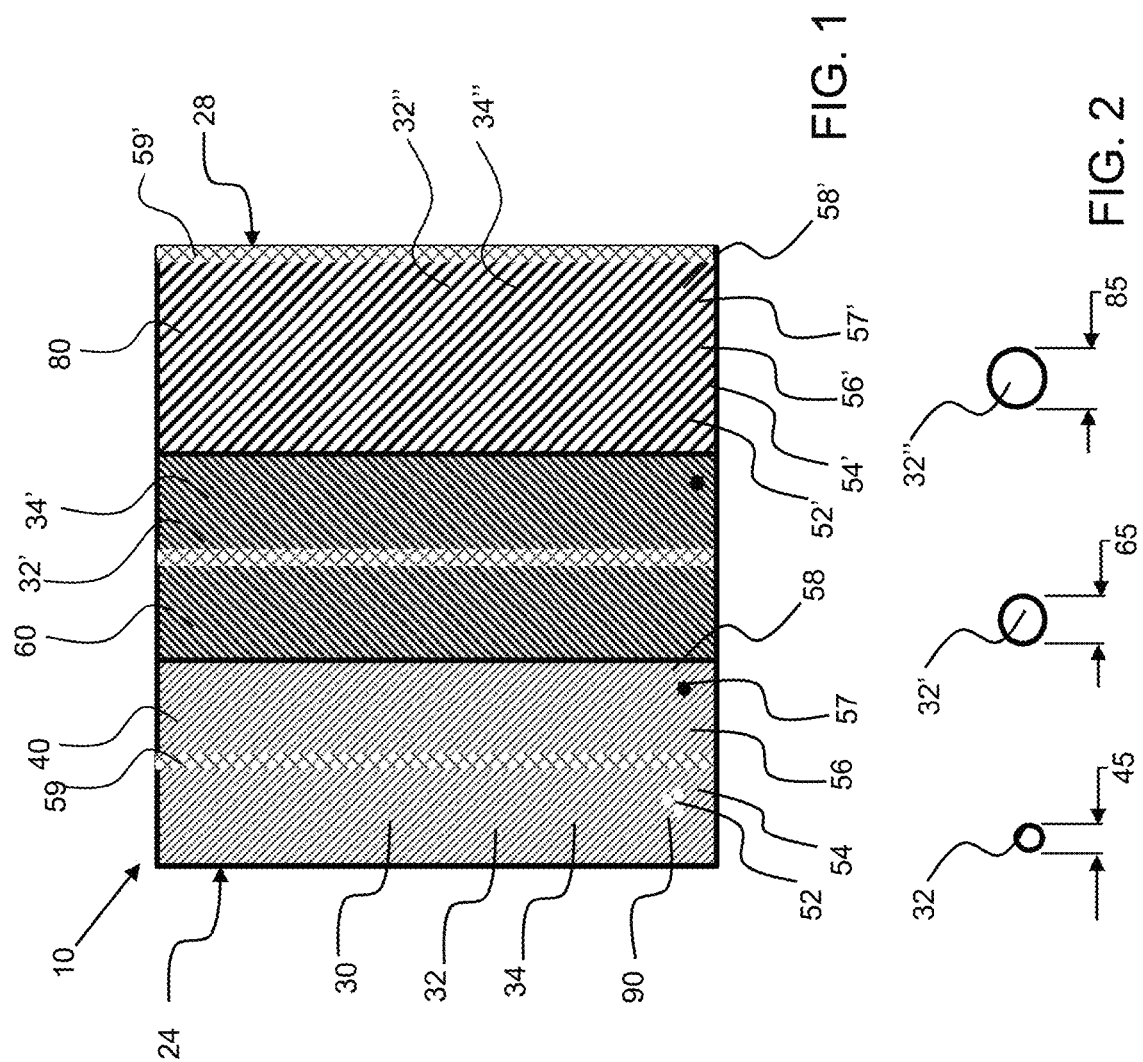

| Material | Formula | Crystal structure | Lattice parameters (Å) | | | Density (g/cm³) | Melting point | |
|---|---|---|---|---|---|---|---|---|
| | | | a | b | c | | (°C) | (°F) |
| Hafnium carbide | HfC | FCC | 4.638 | 4.638 | 4.638 | 12.76 | 3958 | 7156 |
| Tantalum carbide | TaC | Cubic | 4.455 | 4.455 | 4.455 | 14.5 | 3768 | 6814 |
| Niobium carbide | NbC | Cubic | | | | 7.82 | 3490 | - |
| Zirconium carbide | ZrC | FCC | 4.693 | 4.693 | 4.693 | 6.56 | 3400 | 6152 |
| Hafnium nitride | HfN | FCC | 4.525 | 4.525 | 4.525 | 13.9 | 3385 | 6125 |
| Hafnium boride | HfB2 | Hexagonal | 3.142 | — | 3.476 | 11.19 | 3380 | 6116 |
| Zirconium boride | ZrB2 | Hexagonal | 3.169 | — | 3.53 | 6.1 | 3245 | 5873 |
| Titanium boride | TiB2 | Hexagonal | 3.03 | — | 3.23 | 4.52 | 3225 | 5837 |
| Titanium carbide | TiC | Cubic | 4.327 | 4.327 | 4.327 | 4.94 | 3100 | 5612 |
| Niobium boride | NbB2 | Hexagonal | 3.085 | - | 3.311 | 6.97 | 3050 | |
| Tantalum boride | TaB2 | Hexagonal | 3.098 | — | 3.227 | 12.54 | 3040 | 5504 |
| Titanium nitride | TiN | FCC | 4.242 | 4.242 | 4.242 | 5.39 | 2950 | 5342 |
| Zirconium nitride | ZrN | FCC | 4.578 | 4.578 | 4.578 | 7.29 | 2950 | 5342 |
| Silicon carbide | SiC | Polymorphic | — | Various | — | 3.21 | 2545 | 4613 |
| Vanadium carbide | VC | Cubic | | | | 5.77 | 2810 unstable | - |
| Tantalum nitride | TaN | Cubic | 4.33 | 4.33 | 4.33 | 14.3 | 2700 | 4892 |
| Niobium nitride | NbN | Cubic | | | | 8.47 | 2573 | - |
| Vanadium nitride | VN | Cubic | | | | 6.13 | 2050 unstable ? | - |

FIG. 3

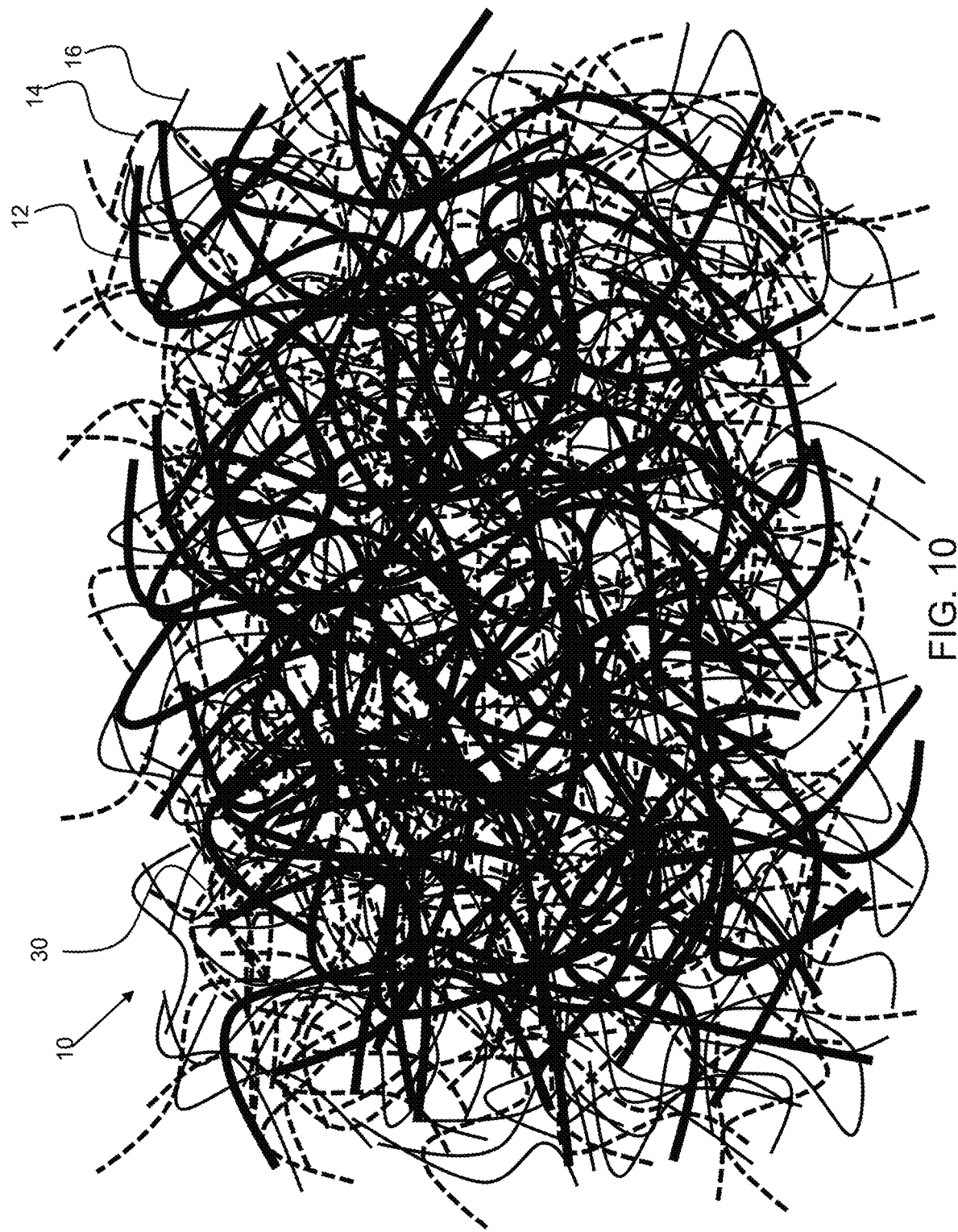

HIGH TEMPERATURE FLEXIBLE INSULATION FOR EXTREME ENVIRONMENTS

CROSS REFERENCE TO RELATED APPLICATIONS

This application claims the benefit of priority to U.S. provisional patent applications No. 63/134,977, filed on Jan. 8, 2021, U.S. provisional patent application No. 63/134,975, filed on Jan. 8, 2021, and to U.S. provisional patent application No. 63/298,168, filed on Jan. 10, 2022; the entirety of all three provisional applications are hereby incorporated by reference herein.

BACKGROUND OF THE INVENTION

Field of the Invention

The invention relates to deployable aerodynamic decelerators for aerospace vehicles that enable and enhance robotic and scientific missions to locations with atmospheres such as Mars, Venus, Titan and Earth.

Background

NASA is developing deployable aerodynamic decelerators to enhance, and enable, robotic and scientific missions to destinations with atmospheres such as Mars, Venus, and Titan, as well as returning payloads to Earth from Low Earth Orbit (LEO). The benefit of deployable decelerators is that relatively large atmospheric entry vehicles can be designed to fit within a comparatively small vehicle launch fairing. Deployable decelerator technology will enable delivery of an estimated 20 metric tons of payload required to support human exploration of Mars, and will also enable return of large payloads from Low Earth Orbit as well as launch asset recovery for reduced cost of space access. For human exploration of Mars, it is estimated that a deployable decelerator may have a diameter of 18 meters which, for an inflatable system, will require over 100 cubic meters of hydrogen gas at a weight of nearly 700 kgs.

Inflatable, pressure-stabilized structures of these deployable decelerators are inherently comprised of thin membranes that can be readily folded and packaged into a small volume. The resulting structural wall, which must be protected from aerodynamic heating, is very thin and has little capacity to store heat. Therefore, a relatively thick layer of thermal insulation is required to limit the amount of heat reaching the structural wall so that its maximum temperature limit is not exceeded. This insulation must also be folded and packaged into a small volume before being deployed. Therefore, the insulation for this application should be not only low mass, but also thin and flexible. In fact, a designer may have to trade some mass efficiency for an insulation that is thinner and can be packaged more compactly.

SUMMARY OF THE INVENTION

The invention is directed to deployable aerodynamic decelerators for aerospace vehicles that enable and enhance robotic and scientific missions to locations with atmospheres such as Mars, Venus, Titan and Earth.

A recent study included sizing thermal protection systems for three different Martian decelerator configurations included calculations for a Hypersonic Inflatable Aerodynamic Decelerator (HIAD). Details are provided in the Detailed Description with reference to the figures.

Ruggedized Opacified Fibrous Insulation (ROFI) are being developed and evaluated for HIAD. An exemplary ROFI utilizes silicon carbide whiskers as opacifiers and those opacifiers enhance the performance of ROFI such that a significant reduction in thickness is anticipated.

A high temperature flexible insulation material may be configured to substantially reduce the amount of radiation transmitted therethrough by incorporating a reflective mat of high temperature fibers that withstand temperatures of at least 500° C., or for higher temperature applications, at least 1,000° C. or higher. The radiation may be attenuated through the thickness of the deployable high temperature flexible insulation, or through individual layers of insulation mats thereof. The insulation mat may have optical properties to produce a transmittance of no more than 5% over a range of temperature from 500° C. to 5000° C. The mat may include high temperature fibers such as carbon and/or silicon carbide, among others, and these fibers may be coupled by a binder in a non-woven fabric. These binders, may be nano-fiber binders. The flexible insulation material may be configured in a deployable aerodynamic decelerator or a Hypersonic Inflatable Aerodynamic Decelerator (HIAD) and may be durably flexible.

An exemplary insulation mat may include carbon fibers designed and manufactured for their ability to attenuate infrared radiation peaking at a specific temperature or range of temperatures. The insulation mat may have optical properties optimized to to have substantially reduce transmittance and may reflect radiation, absorb the radiation and/or absorb and reflect and re-emit the radiation. The radiation may be scattered to prevent it from passing through the high temperature flexible insulation material. By these methods, and by adjusting the volume fraction of fibers per unit volume, the extinction coefficient of the insulation mat may be optimized for a specific application.

An insulation mat of an exemplary deployable high temperature flexible insulation comprises a structural component, an extinction coefficient and a binder component that are integrated together to provide high temperature resistance with durability and flexibility. The insulation mat may be folded and packed down and retained for very long periods of time in outer space, where the temperature may be less than −250° C. Upon entry back into the atmosphere, the deployable high temperature flexible insulation may be deployed, wherein the folded insulation mat is unfolded to deflect or shield an object or components of a space craft from high heat.

The structural component may be any of alumina, carbon, silica, mullite, a carbide, a nitride, a boride, and combinations thereof. An exemplary structural component may include high temperature fibers, such as alumina fibers that have a length of about 15 mm or more, about 25 mm or more, about 50 mm or more, about 100 mm or more and any range between and including the length values provided. The average diameter may be less than about 1 μm, about 1 μm or more, about 3 μm or more, about 5 μm or more and any range between and including the diameter values provided. It is important that the structural component have a length that enables effective entanglement. The longer the length, the more durable the insulation mat may be, especially for folding and deploying from a folded or packed configuration.

In a more commercial application of this invention, the structural component would be a natural fiber like wool.

Typical wool fibers are 25 um in diameter, and would be shortened to 25 mm or less to facilitate production of the invention.

The extinction component may be designed to optimize performance over a specific range of wavelengths corresponding to a specific heat pulse encountered during use. Factors like emittance, diameter and index of refraction, are considered when designing and manufacturing the fibers or particles to be used as the extinction component. The density of those fibers or particles in a given volume will determine the number of interactions between wavelengths of radiation and the extinction components, and is therefore a crucial design factor in optimizing the extinction component.

The extinction component may be selected to provide factors like emittance, fiber diameter and index of refraction, emittance that is optimized for the expected or calculated temperature that the insulation mat will be exposed to. The specific density, fibers or particles per volume, of the extinction component may be important to filter our infrared radiation through the thickness of the insulation mat. As described herein the type of extinction material, and the size and density may be change through the thickness of the deployable high temperature flexible insulation. An outside layer of the deployable high temperature flexible insulation may include a smaller sized extinction component than an insulation mat forming an inside layer. The extinction component may be any of alumina, carbon, silica, mullite, a carbide, a nitride, a boride, and combinations thereof and may have a diameter from less than about 1 μm, about 1 μm or more, about 3 μm or more, about 5 μm or more and any range between and including the diameter values provided. Again, the change in diameter from an outside layer to an inside layer may be about 20% or more, about 50% or more about 100% or more and any range between and including the percentages provided. The extinction component may be SiC, for example that may have a diameter of less than 1 um, such as about 0.5 μm to 1 μm on average. A deployable high temperature flexible insulation designed for a short heat pulse may have bigger fiber diameter differential of the extinction component from the outside layer to the inside layer as the heat gradient through the insulation material may be greater than when a longer heat pulse is required. When there is a long exposure to a high temperature, the temperature proximal to or within the inside layer may approach that of the temperature of the outside layer. Additionally, the heat capacitance of the extinction component can be optimized with respect to the total heat load.

An exemplary binder component is configured to further bind together the structural and extinction components and may include a cellulous material, such as rayon, Polyvinyl acrylate (PAN), colloidal alumina and/or colloidal silica and/or polypropylene fibers. An exemplary binder is a fibrous binder component, and preferably a nano-fibrous component, such as polyacrylonitrile (PAN) nano-fibers having an average diameter that is less than 1 micron meter and of a length to diameter ratio of about five or more, about 10 or more, about 20 or more, about 50 or more, 100 or more and any range between and including the ratios provided. A longer fibrous binder may more effectively become entangled with the structural component and extinction component and produce a more durable and/or flexible insulation mat. Additionally, a non-fibrous binder may be included, such as an acrylic or silicone binder, such as Polyseamseal available from Loctite, (Hartford, CT), a low viscosity, water soluble adhesive that is flexible when cured. This non-fibrous binder may be added to the insulation mat in a weight concentration of about 3% to 5%, about 10% or more, about 20% or more, or even or up to 30% by weight and any range between and including the values provided.

The binder may be a material that does not melt, but rather decomposes when exposed to very high heats, such as polyacrylonitrile (PAN), that ablates when exposed to high temperatures. This ablation process is endothermic and therefore reduces the heat or temperature within the insulation mat and which enables the insulation mat to be subjected to a longer and/or higher temperature heat exposure. The nano-fibrous binder may be PAN or cellulous fibers from Engineered Fibers Technology, Rockford, IL (images shown on www.eftifibers.com/Prod_EFTecNano).

The ratio of components may be selected to provide effective heat insulation, flexibility and durability. For example, as described herein the amount of binder included in the insulation mat may be surprising high, such as at least 10% or more by weight, at least 15% or more by weight, at least 20% or more by weight, about 25% by weight or more, about 30% or more by weight or from about 10% to about 30% by weight and any other range between and including the percentages provided. This high weight percent of binder provides effective durability and flexibility but also provides heat dissipation as it ablated or absorbs heat during decomposition. The structural component may be included in a weight percent of the insulation mat of about 25% or more, about 30% or more, about 40% or more, about 50% or more, from about 25% to about 60% and any other range between and including the values provided. A minimum amount of the structural component may be required for structural durability during exposure to high temperatures after being deployed. As the binder decomposes, the structural component has to be effective to maintain the structure of the insulation mat. The extinction component may be included in a weight ratio of the insulation mat of about 25% or more, about 30% or more, about 40% or more, about 50% or more, from about 25% to about 60% and any other range between and including the values provided. The structural component and the extinction component may be different materials having different compositions and/or diameters and lengths.

The binder and/or the high temperature fibers used as structural components or extinction components may be produced through electrospinning. Electrospinning may be used to produce the high temperature fibers, such SiC whisker that are about 10 mm or longer, about 20 mm or longer, about 25 mm or longer, such that they may provide effective structural support and also provided emissivity properties. Electrospinning may enable the structural and extinction components to be the same material.

For lower temperature embodiments alternative materials may be used that are not as temperature resistant, such as natural fibers, including wool, that may bound together by a fibrous binder, such as cellulose or PAN, and other non-fibrous binders such as a silicone, for example, Loctite PolySeamSeal, IDH number 1510049, a water-based silicone sealant. This lower temperature embodiment may also include silica aerogel, alumina aerogel, aluminosilicate aerogel, fumed silica or micro-balloons that is bound into the insulation mat and may be bound between layers of insulation mats by the binder, fibrous or non-fibrous.

Other material may be included in the insulation mat including aerogel. Aerogels, fumed silica, micro-balloons and other additives can be included to reduce solid gas conduction and gas thermal conductivity. While these are unimportant in a vacuum, insulations used in a gaseous atmosphere require consideration of these heat transfer mechanisms. The additives are optimized by two means; first, the molecular mean free path can be minimized, which means that the gas molecules have little room for movement whereby they can transfer heat to surrounding surfaces, and second, by choosing materials with minimal heat capacitance such that heat cannot be readily transferred from gas molecules to the surrounding surfaces if they are already at the same temperature. Microspheres, aerogels, fumed silica and fumed alumina are four examples of materials that could be chosen for these properties. The pore sizes of these additives can be as small as $10^{-7}$ m, which is small enough to prevent gas movement. Including these additives can reduce the pore size from $10^{-4}$ m, which is typical of fibrous insulations, to $10^{-6}$ m, which is not uncommon for fiber reinforced aerogels. Using fumed silica, fumed alumina or microspheres could be expected to yield a pore size of $10^{-5}$ m, which demonstrates a substantial improvement over fibrous materials alone without the added cost of aerogels. Because the densities of these additives are low, the heat capacitance is also low, so both requirements of the additives are satisfied when the goal is to reduce solid gas conduction and gas thermal conductivity. While these materials don't typically provide structure or radiation attenuation features, it is possible to choose a material, such as carbon aerogel, which offers several desirable features in a single material.

Another additive that may be included in the insulation mat includes a foaming agent, such as pentaerythritol and melamine phosphate that forms a foam with exposed to high temperatures. Carbonaceous foams offer numerous advantages as an insulation additive when the insulation needs to resist high temperatures over 500 C for short periods of time. Carbon has a high emissivity, which means that carbon effectively blocks radiative heat transfer, and also efficiently re-emits any absorbed heat back towards its source. With a specific heat of approximately 0.72 J/g° C., the heat capacitance of carbon is not extraordinary but the density is less than half of that of silicon carbide such that the resulting heat capacitance of carbon is substantially less than that of other materials used to block radiation. The result is that less heat is retained by the carbon, and is instead re-emitted toward the source as the insulation reaches thermal equilibrium with it's surroundings. Furthermore, as the carbon degrades it absorbs heat in an endothermic ablation process, which has the further benefit of reducing the through-thickness heat flux in single use applications. When additives are used that result in a carbon foam being created on the insulation surface, the foam can also release a gas which reduces the rate of degradation by blocking interaction with oxygen molecules and thereby reducing oxidation rates. Since some additives create the carbon foam in response to heat, a rapidly expanding, self-healing layer of endothermic flame resistant coating can be maintained on the surface of the insulation for a predetermined period of time.

For some applications it is necessary to reinforce the insulation mat so that it can withstand fabrication, packing, storage and deployment. This can be accomplished by the addition of a scrim. Depending on the timing of the mechanical stresses, it may or may not be necessary that the scrim withstand extremely high temperatures. In one example, scrim was added to an insulation layer to increase the tensile strength from approximately 4 lbf, which was not acceptable, to at least 12 lbf, which was acceptable. Other materials in the Flexible Thermal Protection System of the HIAD have tensile strengths between 12 and 52 lbf as measured by ASTM 5034-95(2007). The scrim used in this case was a fiberglass scrim (Style 3004) produced by Textum Inc. (Belmont, NC). In some cases, the scrim was bonded between layers of insulation, and in others it was attached to the surface of the insulation An exemplary high temperature flexible insulation material comprises a mat comprising high temperature fibers that withstand temperatures of at least 500° C., and that has an optical property producing a transmittance of no more than 5% over a range of temperature from 500° C. to 5000° C.

As HIAD vehicles enter a planetary atmosphere, advection is a primary mechanism of heating as the gas molecules force their way through the porous surfaces of the outer fabric layers. The circumstances are similar in a fire shelter resisting wind-driven flames, or a skier wearing a ski parka as s/he skies down a slope at high speeds. To reduce advective heat transfer, a coating can be applied to the outer surface of the insulation that fills in the spaces between the fibers. Since fibrous insulations, including the invention, are typically less than 10% solid, the coating can seal the surface so that the open area between the fibers on the surface of the insulation is sealed against advection. One coating that has been used successfully for this purpose is the Microlite vermiculite coating offered by Specialty Vermiculite Corp. (Bala Cynwyd, PA). Depending on the porosity of the insulation and the pressure differential within it, reducing advection by adding a coating can significantly improve the insulation's ability to reduce heat transfer.

An exemplary high temperature flexible insulation material, or mat of high temperature fibers thereof, may be durably flexible wherein it can be folded over upon itself and creased by hand three times without tearing, or wherein it can be folded over upon itself to produce a fold and maintain at least 50% of an original tensile strength across the fold when unfolded.

An exemplary high temperature flexible insulation material may be configured in a deployable aerodynamic decelerator or a Hypersonic Inflatable Aerodynamic Decelerator.

EXAMPLE #1

Ruggedized Opacified Fibrous Insulation to Reduce Radiative Heat Transfer in Non-Oxidizing Environments Up to About 1650° C., (about 3000° F.)

To suppress radiative heat transfer, SiC whiskers are included at a ratio of 55% by weight. The Unifrax Saffil alumina fibers are chosen to form a structure for the insulation that will withstand high temperatures. The PAN nanofibers are added in a concentration of 12.5%. These organic fibers bond together in the manufacturing process to hold the other constituents in place during fabrication and placement. The PAN fibers will degrade during heating but the insulation will remain intact and useful until disturbed.

In single use applications, this insulation has the added advantage that the materials are stable at high temperatures, while the PAN fibers will absorb heat as they degrade.

TABLE 1

| Extinction Component Haydale silicon carbide fibers (opacifiers) | Structural component UNIFRAX Saffil fibers | Binder Component Sterling PAN binder fibers |
|---|---|---|
| 55.0% | 30.0% | 15.0% |

EXAMPLE #2

About 650° C. (1200° F.) Insulation—this Insulation is Intended for Aerospace, Automotive and Industrial Applications Up to 1200 F in Air The aerogel and fumed silica particles have very low conductivity and low density, and are used in this example to reduce convection and gas conduction within the insulation. Fumed silica particles are smaller than the aerogel particles, and they are mixed in a ratio intended to optimize the particle packing so that void size within the insulation is minimized. To suppress radiative heat transfer, SiC whiskers are included at 12.5% by weight. At higher temperatures, a larger percentage of opacifiers would be appropriate but this insulation is not intended for use above 1200 F. The Johns-Manville silica fibers are chosen to envelope the fumed silica, aerogel and SiC whisker particles, and, together with the longer Unifrax Saffil alumina fibers, form a structure for the insulation. The PAN nanofibers are added in a concentration of 18%. These organic fibers bond together in the manufacturing process to hold the other constituents in place during fabrication and placement. The PAN fibers will degrade on heating but the insulation will remain intact and useful until disturbed.

If used to insulate batteries, and isolate the batteries in case of thermal runaway, this insulation has the added advantage that the materials are stable at high temperatures, and the PAN fibers will absorb heat and absorb local oxygen as they degrade, which reduces the risk of fire in the case of thermal runaway.

TABLE 2

| Extinction Component Haydale SiC fibers | Structural Component JM silica fibers | Structural component UNIFRAX Saffil alumina fibers | Cabot fumed silica aerogel | Cabot IC3100 aerogel | Binder Component Sterling PAN binder fibers |
|---|---|---|---|---|---|
| 12.5% | 20.0% | 10.0% | 32.9% | 6.6% | 18.0% |

EXAMPLE #3

Textile Insulation for Use in Recreational and Industrial Clothing

The aerogel and fumed silica particles have very low conductivity and low density, and are used in this example to reduce convection and gas conduction within the insulation. Fumed silica particles are smaller than the aerogel particles, and they are mixed with aerogel particles in a ratio intended to optimize the particle packing so that void size within the insulation is minimized. To suppress radiative heat transfer and to make the insulation appear whiter for use behind sheer fabrics, 8% titanium dioxide powder is added. A high percentage of wool fibers are used because of wool excellent characteristics as a clothing insulation, including breathability, warmth-when-wet, and organic sourcing. Additionally wool fibers are slightly curly, and, combined with nanofibrilated PAN fibers will form the structure of the insulation that encapsulates the particles and powder. Optionally, the finished insulation could also be coated with a waterproof binder, such as Loctite's PolySeamSeal such that the insulation will withstand 20 laundering cycles, or laminated with one other fabric, or between two fabrics such that the insulation can be used in clothing, dive suits and other items without stitching directly through the insulation.

TABLE 3

| Extinction Component titanium dioxide powder | Structural Component wool | Cabot fumed silica aerogel | Cabot IC3100 aerogel | Binder Component Sterling PAN binder fibers |
|---|---|---|---|---|
| 8.0% | 47.0% | 25.0% | 5.0% | 15.0% |

EXAMPLE #4

High Temperature Insulation for Oxidizing Environments Up to About 1100° C. (About 2000° F.)

Fumed silica particles withstand moderately high temperatures, have very low conductivity and low density, and are used in this example to reduce convection and gas conduction within the insulation. To suppress radiative heat transfer, SiC whiskers are included at 17.5% by weight. The UniFrax W657 fibers are chosen to envelope the fumed silica and SiC whisker particles, and, together with the longer Unifrax Saffil alumina fibers, form a structure for the insulation. The PAN nanofibers are added in a concentration of 18%. These organic fibers bond together in the manufacturing process to hold the other constituents in place during fabrication and placement. The PAN fibers will degrade on heating but the insulation will remain intact and useful until disturbed.

If used to insulate batteries, and isolate the batteries in case of thermal runaway, this insulation has the added advantage that the materials are stable at high temperatures, and the PAN fibers will absorb heat and absorb local oxygen as they degrade, which reduces the risk of fire in the case of thermal runaway.

In an alternate embodiment, the fumed silica can be replaced with hydrophobic alumina aerogel to create an insulation with a useful temperature up to 1650° C. (3000° F.). Other properties and characteristics would be similar. UniFrax W657 fibers have a fiber diameter of about 1.5 to 2.5 μm. The Saffil fibers have an average diameter of about 3-4 μm and a length of about 15 mm.

TABLE 4

| Extinction Component Haydale SiC fibers | Structural Component UNIFRAX W657 | Structural Component UNIFRAX Saffil fibers | Cabot fumed silica aerogel | Cabot IC3100 aerogel | Binder Component EFTech Inc. PAN binder fibers |
|---|---|---|---|---|---|
| 17.5% | 30.0% | 10.0% | 30.0% | 0.0% | 12.5% |

EXAMPLE #5

Thermoformable Aerogel Insulation for Use in Forming Low-Temperature Insulated Parts The aerogel and fumed silica particles have very low conductivity and low density, and are used in this example to reduce convection and gas conduction within the insulation. Fumed silica particles are smaller than the aerogel particles, and they are mixed with aerogel particles in a ratio intended to optimize the particle packing so that void size within the insulation is minimized. To suppress radiative heat transfer and to make the insulation appear whiter, 8% titanium dioxide powder is added. A high percentage of wool fibers is used because of wool's excellent characteristics as an insulation, including breathability, warmth-when-wet, and organic sourcing. Additionally wool fibers are slightly curly, and, combined with nanofibrilated PAN fibers will form the structure of the insulation that encapsulates the particles and powder during fabrication. Polypropylene fibers (15%) are also included within the structure so that the insulation can be thermoformed into a shape, like an insole or a food storage container.

TABLE 5

| Extinction Component titanium dioxide powder | Structural Component wool | Binder Component Sterling PAN binder fibers | Cabot fumed silica aerogel (cheaper) | Cabot IC3100 aerogel (expensive) | Binder Component MiniFibers Inc. 12 mm polypropylene fibers |
|---|---|---|---|---|---|
| 8.0% | 42.0% | 5.0% | 25.0% | 5.0% | 15.0% |

Thermal degradation, as used herein, means there is appreciable mass loss (at least 10% or more) when heated in a non-oxygenated environment or that the materials melts and changes the state of matter from solid to liquid.

An average size of a high temperature fiber or of an extinction component, such as a fiber or particle, is the average diameter of the fibers or the average particle size of the particles, which may be a powder.

The fibers in the structural, extinction and/or the binder components may be randomly oriented in plane with the insulation mat, wherein the length of the fibers extend across the insulation mat versus through the thickness of the insulation mat. They are preferably substantially oriented in plane, or orthogonal to the direction of heat flow from the outside surface to the inside surface.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows a cross-sectional view of an exemplary high temperature flexible insulation material, that has an outside layer, an intermediate layer and an interior layer, each comprising an insulation mat of high temperature fibers that are bound together by a fibrous binder.

FIG. 2 shows the fiber diameters of the high temperature fibers in each of the insulation mat layers.

FIG. 3 shows a list of exemplary materials that may be used as the high temperature fibers in the insulation mats shown in FIG. 1.

FIG. 10 shows a diagram of an exemplary deployable high temperature insulation comprising an insulation mat composed of a structural component, an extinction component and a binder component.

Figure 4:
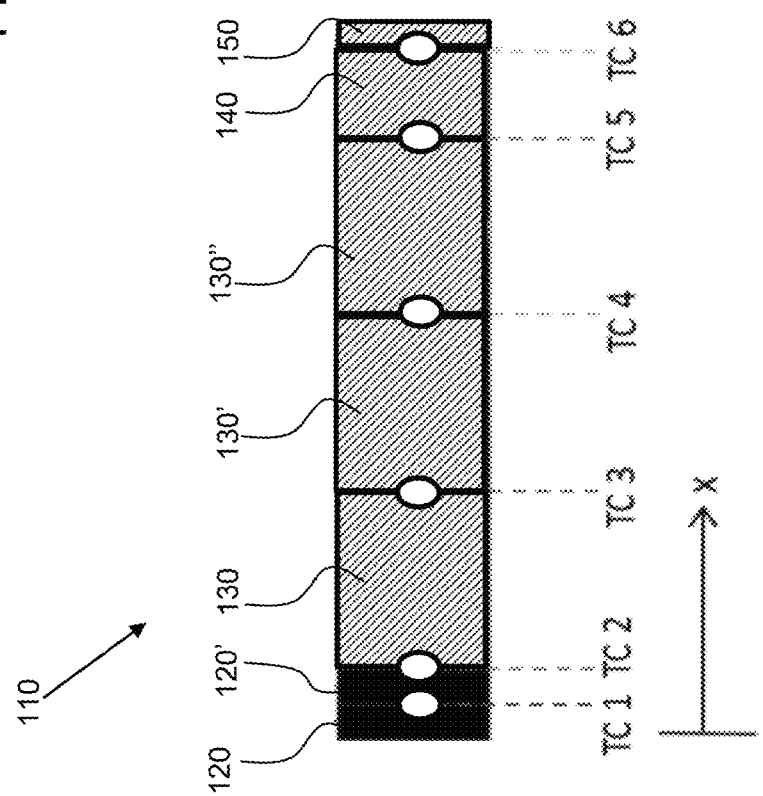
FIG. 4 shows cross sectional diagram of a Prior Art Hypersonic Inflatable Aerodynamic Decelerator (HIAD) Thermal Protective System (TPS).

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Referring now to FIGS. 1 and 2, an exemplary deployable high temperature flexible insulation 10, has an outside layer 40 configured on an outside surface 24, an interior layer 80 configured on an inside surface 28 and an intermediate layer 60 configured between the outside layer and inside layer. Each layer is an insulation mat 30 of high temperature fibers that are bound together by a fibrous binder. The outside layer 40 has high temperature fibers 32 and a fibrous binder 34, the inside layer 80 has high temperature fibers 32" and a fibrous binder 34" and the intermediate layer 60 has high temperature fibers 32' and a fibrous binder 34'. One or more of the layers of insulation mat may include additives 50 as described herein, including but not limited to, aerogel 52, foaming agent 54, a coating 56 such as vermiculite, fumed silica 57, and micro-balloons 58. As shown, these additives are in the outside layer 40 and may also be in one or more of the other layers, the intermediate layer 60 and/or the inside layer 80. As shown, the inside layer may also have additives, including but not limited to, aerogel 52', foaming agent 54', a coating 56' such as vermiculite, fumed silica 57', and micro-balloons 58', and the concentration of any of these additives may be different from the concentration in the outside layer. A scrim 59, 59' may be coupled with one or more of the layers of insulation. As shown, a scrim 59 is configured in the outside layer 40 and also the intermediate layer 60, wherein the insulation mate is configured on opposing sides of the scrim. Also, a scrim 59' is coupled to the inside layer 80, wherein the scrim is coupled to the inside surface 28 of the insulation mat 30. A vermiculite coating may be used as an adhesive to bond the scrim to an insulation layer.

As shown in FIG. 2, the high temperature fibers 32 of the outside layer 40 are smaller in diameter that the high temperature fibers of the intermediate and inside layers. The high temperature fibers 32' of the intermediate layer are smaller in diameter than the high temperature fibers of the inside layer. This gradient of fiber diameters and fiber materials enables each layer to have an emittance and refractive index that corresponds with the temperature the layer may be exposed to.

FIG. 3 shows a list of exemplary materials that may be used as the high temperature materials, such as fibers in the insulation mats shown in FIG. 1. The materials include a carbide, including hafnium carbide, tantalum carbide, niobium carbide and the like, a boride such as hafnium boride, zirconium boride and the like, and a nitride such as hafnium nitride, titanium nitride and the like. Note that all of these materials have a melting temperature of more than 2000° C. These materials would have thermal degradation temperature in a non-oxygenated environment that would be above 2000° C. This data and table was found on: https://en.wikipedia.org/wiki/Ultra-high-temperature ceramics.

Figure 5:
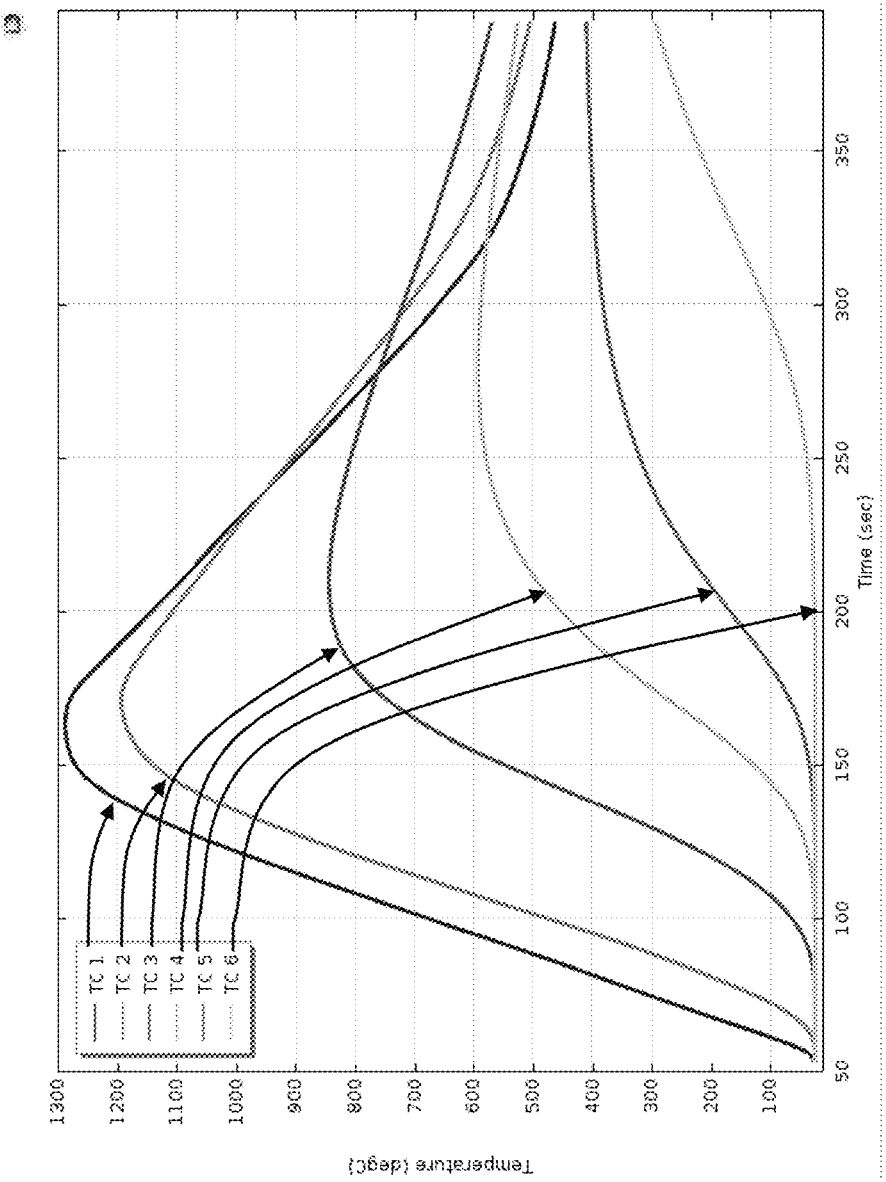
FIG. 5 shows a graph of Calculated HIAD TPS temperature for an aerocapture trajectory.

A sketch of the thermal model of the flexible thermal protection system (FTPS) 110 of the HIAD wall configuration is shown in FIG. 4. The wall consists of two outer layers of silicon carbide fabric 120, 120', three layers of a 5 mm thick carbon felt insulation layer 130, 130', 130", a layer of fiber reinforced silica aerogel insulation 140 (Pyrogel 2250) and a Kapton gas barrier on the inner surface 150. Temperatures for the thermocouple locations (TC1 to TC6) indicated in FIG. 4 were calculated for both an aerocapture trajectory and an entry trajectory. The calculated temperature histories for an aerocapture trajectory are shown below in FIG. 5. The insulating layers reach peak temperatures between 300° C. and 1200° C. The ambient gas pressure, which affects insulation thermal conductivity, will vary from vacuum to the Martian surface atmospheric pressure for entry trajectories and from vacuum to somewhat less than surface atmospheric pressure for an aerocapture trajectory.

There are three primary modes of heat transfer through low density insulation: solid conduction, gas conduction, and radiation (neglecting any mass flow through the insulation). Dr. Daryabeigi, NASA LaRC, has calculated the relative contribution of each of these three heat transfer modes for a typical fibrous insulation (Saffil alumina).

Figure 6:
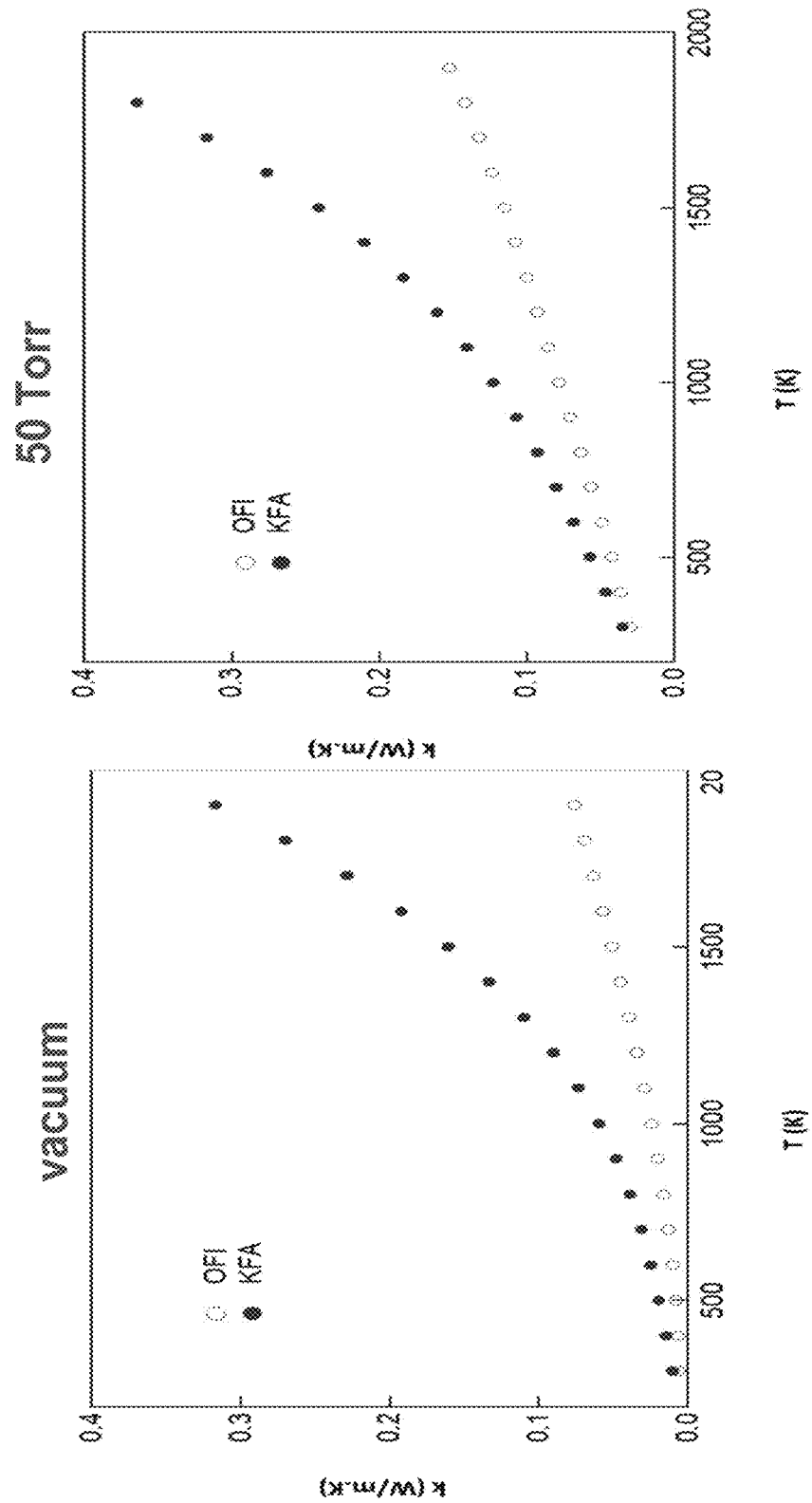
FIG. 6 shows graphs comparing the thermal conductivity of ROFI to carbon felt, available from (SGL Carbon, Wiesbaden Germany).

As shown in FIG. 6, the thermal conductivity of ROFI is compared to carbon felt at vacuum and at 50 torr. Carbon felt is the higher temperature insulation used on top of the flexible thermal protection system (FTPS) stack-up for HIAD. Data is graphed from 0 to 2000 K, bracketing the expected Outer Mold Line (OML) temperatures during re-entry. For all temperatures and pressures, ROFI has significantly lower thermal conductivity than carbon felt based flexible thermal protection system 100, shown in FIG. 4. In vacuum, the ratio of thermal conductivity of the ROFI to the FTPS varies between 0.53 at 300 K to 0.23 at 1900 K. At the 50 torr, the ratio of thermal conductivity of the ROFI to the FTPS varies between 0.84 at 300 K to 0.36 at 1900 k. Note that data was obtained after initial heat treatment to remove binders.

Figure 7:
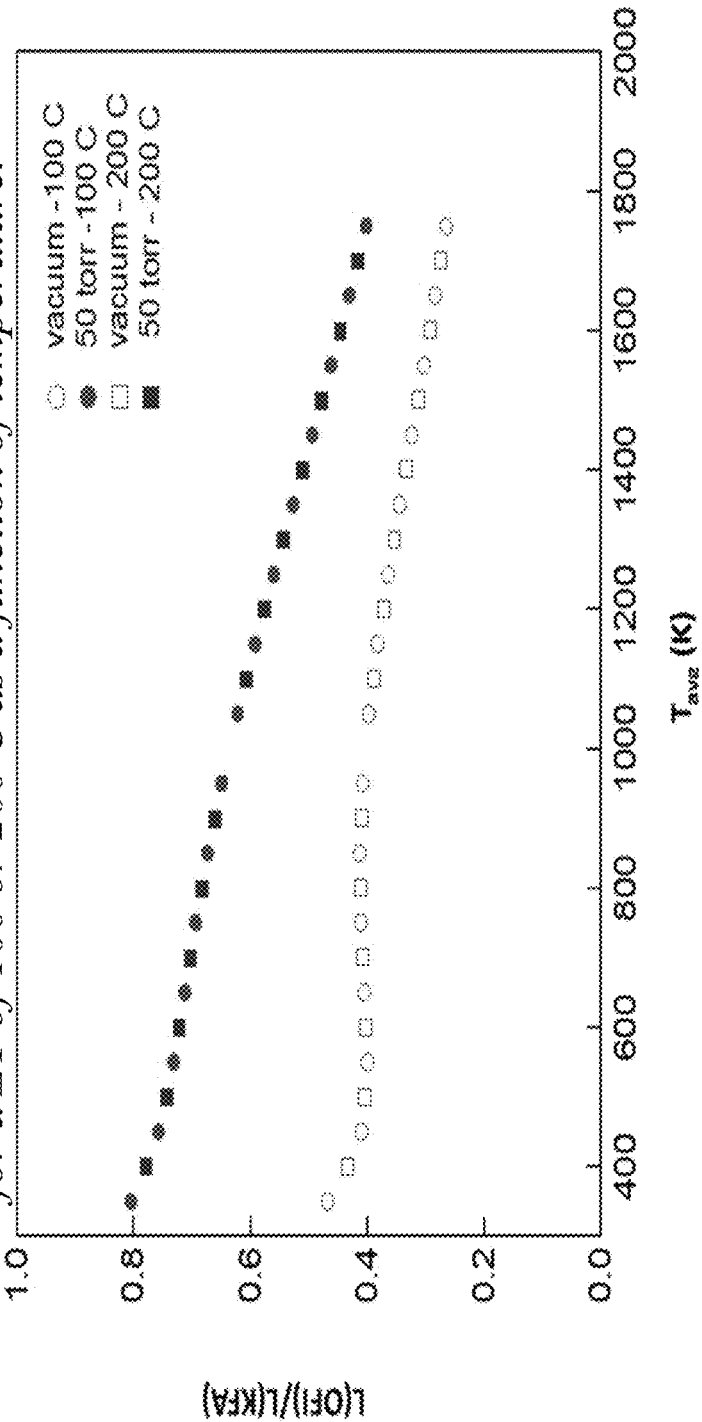
FIG. 7 shows a graph of thickness reduction prediction for substituting ROFI in place of the carbon felt layers in the F-TPS lay-up.

As shown in FIG. 7, the thickness reduction is predicted for substituting ROFI in place of the carbon felt layers in the FTPS lay-up. The ratio of required thickness of ROFI and carbon felt for maintaining temperature drop of either 100° C. or 200° C. across insulation thickness at various mean temperatures at two static pressures is provided in FIG. 7. The resulting dimensionless comparison factor indicates the thickness of ROFI required as a fraction of the carbon felt it is replacing. These values are plotted in FIG. 7 over a range of temperatures from 0 to 2000 K. In vacuum, the ratio of thickness of the ROFI to the FTPS varies between 0.46 at about 200 K to 0.26 near 1800 K. Therefore in vacuum, if a 3.175 mm (0.125 in) thick layer of FTPS is required, only a 1.27 mm (0.05 in) thick ROFI layer would be required for the same performance. At the 50 torr, the ratio of thickness of the ROFI to the FTPS varies between 0.8 at about 200 K to 0.4 near 1800 k. Therefore, at 50 torr, if a 3.175 mm (0.125 in) thick layer of FTPS is required, only a 1.9 mm (0.075 in) thick ROFI layer would be required for the same performance. While the thickness advantage varies for the two pressures over the range of temperatures, there is on average a 40% thickness reduction.

Although a 40% thickness reduction in the carbon felt layers would be significant, it may come at the cost of a weight penalty. Carbon felt has a density of 97.5 kg/m3 and ROFI has a density of 220 kg/m3, so a 40% thickness reduction would incur a 35% weight increase if ROFI was substituted for carbon felt. The higher density of ROFI is attributed to the higher molecular density of the silicon carbide and alumina fibers compared to the carbon fibers in carbon felt. A non-ruggedized, binderless version of ROFI was originally developed for long duration transatmospheric missions where the oxidation of carbon would not be acceptable and the thermal mass of silicon carbide was advantageous. Neither of those requirements apply to the HIAD.

As taught by Lee (Radiation Heat Transfer Through Carbon Fiber Materials: Experiment vs Theory, 2019), radiative heat transfer through a fibrous media is determined by the size distribution of the fibers, solid volume fraction, which is typically less than 10%, the refractive index of the insulation materials, and the spatial orientation of the fibers.

In the HIAD F-TPS lay-up shown above in FIG. 4, much of the radiative heat transfer is reduced through the three carbon felt layers.

Figure 8:
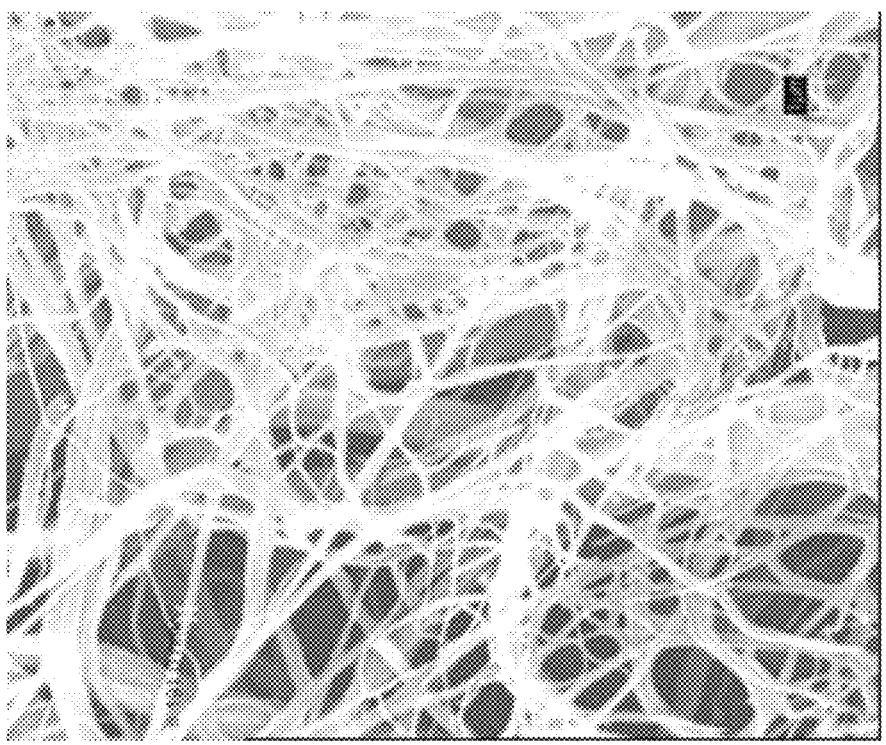
FIG. 8 shows a scanning electron micrograph of an exemplary fibrous binder that includes nano-fibers, or fibers that are less than a micron in cross-sectional size.

As shown in FIG. 8, the fibrous binder may include nano-fibers, as shown in the scanning electron micrograph (SEM). A 1 micrometer bar is shown on the image for scale.

Figure 9:
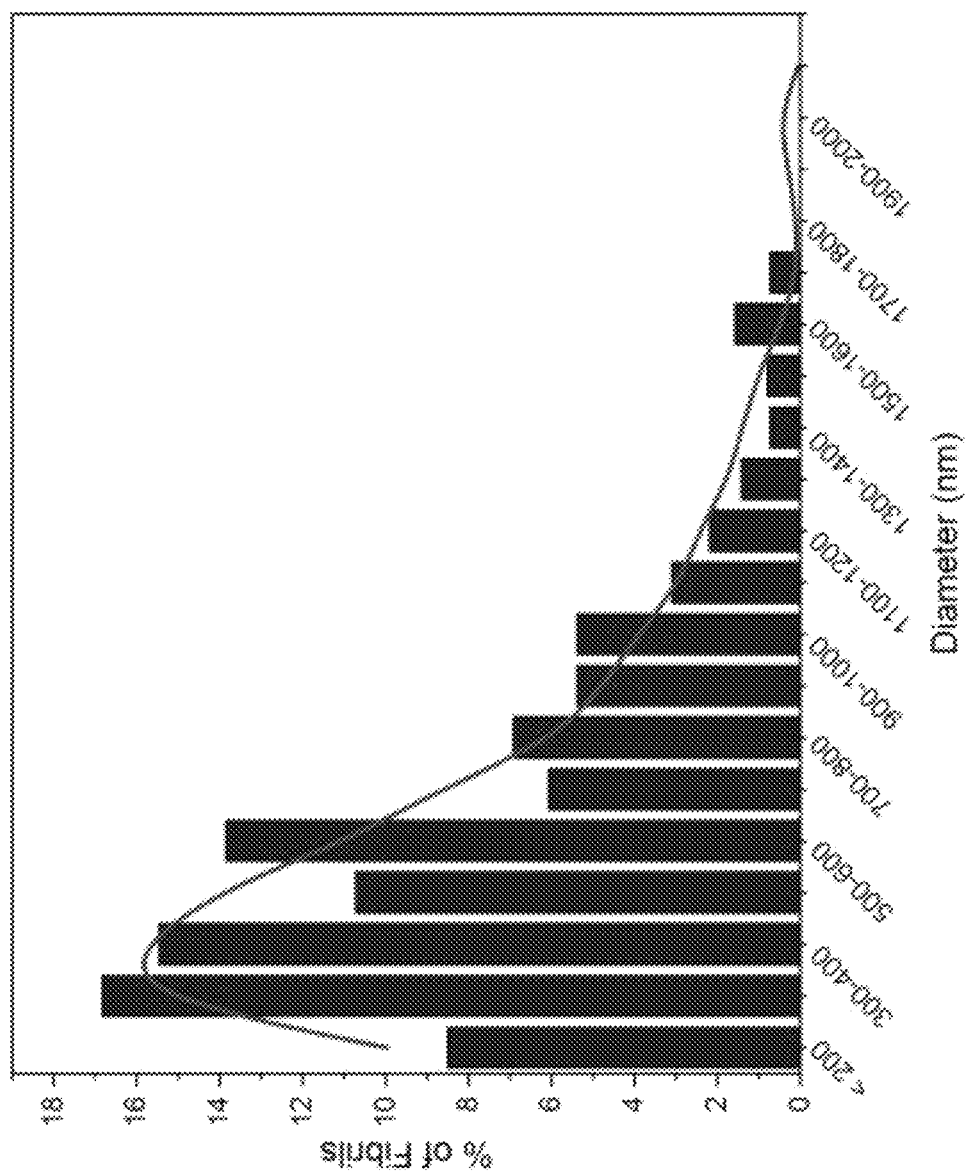
FIG. 9 shows the diameter distribution graph for the fibrous binder shown in FIG. 9, and available from Engineered Fibers Technology, Rockford, IL (images shown on www.eftifibers.com/Prod_EFTecNano.

As shown in FIG. 9, the fibrous binder has a distribution of fiber diameters, or cross-length widths, that are substantially below 1 micro meter, wherein at least 60% of the fibrous binder has a diameter less than 1 micro meter. The fibrous binder may be made out of rayon, a synthetic fiber, made from natural sources of regenerated cellulose. Rayon may include wood or agricultural products. It has the same molecular structure as cellulose. The fibrous binder may be made from Polyacrylonitrile (PAN), also known as polyvinyl cyanide and Creslan 61. While PAN is a thermoplastic, it does not melt under normal conditions, rather it degrades before it melts. PAN fibers can aid in heat management and dissipation through the ablation degradation process, that absorbs heat.

It has been surprising found that incorporation of a fibrous binder especially a nano-fibrous binder enables the high temperature flexible insulation shield to be folded into a compact package and then later deployed wherein the folds open up to deflect heat, such as upon entry back into the Earth's atmosphere. And further surprising to find a fiber that acts as a binder and degrades endothermically to further increase the effectivesness of the material at reducing cool side temperatures.

Referring now to FIGS. 8 and 9, an exemplary binder component, may be a nano-fibrous binder component, having an average diameter that is less than 1 micron meter and of a length to diameter ratio of about five or more, about 10 or more, about 20 or more, about 50 or more, 100 or more and any range between and including the ratios provided. A longer binder may more effectively become entangled with the structural and extinction components and produce a more durable and/or flexible insulation mat. As described herein the amount of binder included in the insulation mat may be surprising high, such as at least 10% or more by weight, at least 15% or more by weight, at least 20% or more by weight, about 25% by weight or more, about 30% or more by weight or from about 10% to about 30% by weight and any other range between and including the percentages provided.

The binder may be a material that does not melt, but rather decomposes when exposed to very high heats, such as polyacrylonitrile (PAN), that ablates when exposed to high temperatures. This ablation process is endothermic and therefore reduces the heat or temperature within the insulation mat and which enables the insulation mat to be subjected to a longer and/or higher temperature heat exposure. The nano-fibrous binder may be PAN or cellulous fibers from Engineered Fibers Technology, Rockford, IL (images shown on www.eftifibers.com/Prod_EFTecNano.

As shown in FIG. 10, an insulation mat 30 of an exemplary deployable high temperature flexible insulation 10 comprises a structural component 12, an extinction component 14 and a binder component 16 that are integrated together to provide high temperature resistance with durability and flexibility. The insulation mat may be folded and packed down and retained for very long periods of time in outer space, where the temperature is less than −250° C. Upon entry back into the atmosphere, the deployable high temperature flexible insulation 10 may be deployed, wherein the folded insulation mat is unfolded to deflect or shield an object or components of a space craft from high heat.

As described herein the structural component may be any of alumina, silica, mullite, a carbide, a nitride, a boride, and combinations thereof. An exemplary structural component may include high temperature fibers, as described herein including alumina fibers that have a length of about 15 mm or more, about 25 mm or more, about 50 mm or more, about 100 mm or more and any range between and including the length values provided. The average diameter may be less than about 1 μm, about 1 μm or more, about 3 μm or more, about 5 μm or more and any range between and including the diameter values provided. It is important that the structural component have a length that enables effective entanglement.

The extinction component may be selected to provide an emissivity that is optimized for the expected or calculated temperature that the insulation mat will be exposed to. As described herein the type of emissivity material, and the diameter may be changes through the thickness of the deployable high temperature flexible insulation. An outside layer of the deployable high temperature flexible insulation may be an insulation mat having a smaller diameter than an insulation mat forming an inside layer. The extinction component may be any of alumina, silica, mullite, a carbide, a nitride, a boride, and combinations thereof and may have a diameter from less than about 1 μm, about 1 μm or more, about 3 μm or more, about 5 μm or more and any range between and including the diameter values provided. Again, the change in diameter from an outside layer to an inside layer may be about 20% or more, about 50% or more about 100% or more and any range between and including the percentages provided. The extinction component may be SiC, for example that may have a diameter of less than 1 um, such as about 0.5 μm to 1 μm on average.

The merits of carbon foams to prevent heat transfer and block flames have been known for centuries. As suggested in "History of a Lost Supermaterial & How To Make It (Starlite Part 2)", Maurice Ward may have created an ablative, carbonaceous intumescent coating that withstood 10,000 C for a very brief time. The same video also explains that intumescent coatings are available as tiles, putty, and paint from various vendors. While these materials offer superior fire protection, they are not available as a freestanding flexible layer suitable for flexible thermal protection systems. Additionally Intumescent nonwoven veils are available from Technical Fibre Products to add fire resistance to composite structures. These layers are flexible, but they are loaded with only a small amount of intumescent powder, typically expandable flake graphite, and therefore don't offer as much protection as the systems made by Ward and others.

This flexible gas barrier includes constituents that will form an ablative, carbonaceous intumescent barrier upon heating. The Unifrax W657 and Saffil fibers form a structure to contain the other constituents. SIC fibers are included to block radiative heat transfer. Fumed silica is included to reduce convection and gas conduction. The nanofibrilated PAN fibers bind the materials together, and, upon degradation, absorb heat like other ablators. To this combination of materials is added a mixture of materials known to produce a carbon foam upon heating, such as pentaerythritol and melamine phosphate. The flexible gas barrier produced can be used as other textiles, but will quickly provide a fire resistant gas barrier upon heating.

TABLE 6

Change in density and volume of various opacified
aerogels at prolonged 800° C. temperature

| $Al_2O_3$ Loading, % of Weight | Density Before Heating, kg/m³ | Density After Heating, kg/m³ | Change in Density, % |
|---|---|---|---|
| 0 | 104.4 | 125.4 | 20.11% |
| 5 | 176.6 | 197.1 | 11.31% |
| 10 | 238.2 | 263.3 | 10.54% |
| 15 | 305.5 | 339.3 | 11.06% |
| 20 | 368.9 | 399.9 | 8.40% |
| 40 | 678.3 | 725.5 | 6.96% |

The data supports the following preliminary conclusions:
The addition of metal oxides increases the density of the resultant mixed oxide-aerogels
As the $Al_2O_3$ loading increases, densification due to prolonged exposure to 800° C. is deceased
The higher the loading of $Al_2O_3$, the less shrinkage occurs during prolonged exposure to 800° C.

AT's research indicates that AT can produce silica-alumina aerogels that experience significantly less sintering & densification at high temperatures in quantities necessary to support Phase II and beyond.

Research by Other Researchers Heat transfer in fiber reinforced aerogels has been well characterized by G. R. Cunnington and S. C. Lee, and K. Daryabeigi, among others. Mechanical properties of fiber reinforced aerogels have been investigated by Xiaoguang Yang et al. Methods of embedding particles at a 2 to 5% concentration have been described by Swanson and Henke, and at higher concentrations by Miller, the PI for the proposed Phase I effort. References for the work summarized here are provided below in alphabetical orderCertain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A high temperature flexible insulation comprising:
   a) an outside layer of an insulation mat, comprising:
   i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
   ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.; and
   iii) a binder component of a nano-fibrous binder having a length to diameter ratio of at least 10 and an average diameter of no more than 1 μm;
   b) an inside layer of an insulation mat, comprising:
   i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
   ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.; and
   iii) a binder component of a nano-fibrous binder having a length to diameter ratio of at least 10 and an average diameter of no more than 1 μm; and
   iv) aerogel;
   wherein the average diameter of the high temperature fibers of the inside layer is at least 20% greater than an average diameter of the high temperature fibers of the outside layer, thereby producing a gradient in fiber diameter from the inside layer to the outside layer;
   wherein the high temperature flexible insulation has optical properties to produce a transmittance of no more than 5% over a range of temperature from 500° C. to 5000° C.; and
   wherein said gradient of fiber diameters enables each of the inside layer and the outside layer to have an emittance and refractive index that corresponds to a gradient in temperature through the high temperature flexible insulation from the outside layer to the inside layer.

2. The high temperature flexible insulation of claim 1, wherein the extinction component is a high temperature fiber having an average fiber diameter of no more than 10 μm.

3. The high temperature flexible insulation of claim 1, wherein the extinction component is a particle.

4. The high temperature flexible insulation of claim 3, wherein the extinction component is a particle having an average particle size of no more than 10 μm.

5. The high temperature flexible insulation of claim 3, wherein the extinction component is a powder of titanium oxide.

6. The high temperature flexible insulation of claim 1, wherein the extinction component is silicon carbide.

7. The high temperature flexible insulation of claim 1, wherein the high temperature fibers of the structural component are alumina.

8. The high temperature flexible insulation of claim 7, wherein the extinction component is Silicon Carbide (SIC) fibers.

9. The high temperature flexible insulation of claim 8, wherein the nano-fibrous binder is polyacrylonitrile fibers.

10. The high temperature flexible insulation of claim 1, further comprising a non-fibrous binder.

11. The high temperature flexible insulation of claim 1, further comprising fumed silica.

12. The high temperature flexible insulation of claim 1, further comprising a foaming agent.

13. The high temperature flexible insulation of claim 1, further comprising a coating comprising vermiculite.

14. The high temperature flexible insulation of claim 1, wherein the high temperature fibers of the structural component consist essentially of carbon wherein at least 90% or more of the high temperature fibers are carbon.

15. The high temperature flexible insulation of claim 1, wherein the high temperature fibers of the structural component comprise carbon and silicon carbide.

16. The high temperature flexible insulation of claim 1, wherein the high temperature fibers of the extinction component comprise silicon carbide.

17. The high temperature flexible insulation of claim 1, wherein the fibrous binder comprises cellulous material.

18. The high temperature flexible insulation of claim 1, wherein the insulation mat has a thickness of about 0.5 to about 20 mm.

19. The high temperature flexible insulation of claim 1, wherein the insulation mat has a density of about 0.05 g/cm$^3$ to about 0.50 g/cm$^3$.

20. The high temperature flexible insulation of claim 1, wherein the mat is durably flexible, wherein it can be folded over upon itself and creased by hand three times without tearing.

21. The high temperature flexible insulation of claim 1, wherein the mat is durably flexible, wherein it can be folded over upon itself to produce a fold and maintain at least 50% of an original tensile strength across the fold when unfolded.

22. The high temperature flexible insulation of claim 1, further comprising:
   c) an intermediate layer configured between the inside layer and the outside layer, and comprising high temperature fibers, and wherein the average diameter of said high temperature fibers of the intermediate layer are smaller in diameter than the average diameter of the high temperature fibers of the inside layer.

23. A high temperature flexible insulation comprising:
   a) an outside layer of an insulation mat, comprising:
      i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
      ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.; and
      iii) a binder component of a nano-fibrous binder having a length to diameter ratio of at least 10 and an average diameter of no more than 1 μm
   b) an inside layer of an insulation mat, comprising:
      i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
      ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.;
      iii) a binder component of a nano-fibrous binder having a length to diameter ratio of at least 10 and an average diameter of no more than 1 μm; and
      iv) a scrim of a woven material, wherein the insulation matt of the inside layer is formed on opposing sides of said scrim; and
   b) an intermediate layer configured between the inside layer and the outside layer, and comprising high temperature fibers, wherein the average diameter of said high temperature fibers of the intermediate layer are smaller in diameter than the average diameter of the high temperature fibers of the inside layer;
   wherein the average diameter of the high temperature fibers of the inside layer is at least 20% greater than an average diameter of the high temperature fibers of the outside layer, thereby producing a gradient in fiber diameter from the inside layer to the outside layer;
   wherein the high temperature flexible insulation has optical properties to produce a transmittance of no more than 5% over a range of temperature from 500° C. to 5000° C.; and
   wherein said gradient of fiber diameters enables each of the inside layer and the outside layer to have an emittance and refractive index that corresponds to a gradient in temperature through the high temperature flexible insulation from the outside layer to the inside layer.

24. A high temperature flexible insulation comprising:
   a) an outside layer of an insulation mat, comprising:
      i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
      ii) an extinction component selected from the group consisting of carbon, alumina, silica, mullite, a carbide, a nitride, a boride, titanium oxide and combinations thereof, having an average size of no more than 25 μm and a thermal degradation temperature in a non-oxygenated environment of at least 2000° C.; and
      iii) a binder component of a nano-fibrous binder having a length to diameter ratio of at least 10 and an average diameter of no more than 1 μm
   b) an inside layer of an insulation mat, comprising:
      i) a structural component of a high temperature fibers selected from the group consisting of carbon, alumina, silica, mullite, a carbide, a nitride, a boride, and combinations thereof, said high temperature fibers having an average fiber diameter of no more than 25 μm, and a thermal degradation temperature in a non-oxygenated environment of at least 2000° C.;
      ii) an extinction component selected from the group consisting of carbon, alumina, silica, mullite, a carbide, a nitride, a boride, titanium oxide and combinations thereof, having an average size of no more than 25 µm and a thermal degradation temperature in a non-oxygenated environment of at least 2000° C.;
  iii) a binder component of a nano-fibrous binder having a length to diameter ratio of at least 10 and an average diameter of no more than 1 µm; and
  iv) scrim of a woven material, wherein the insulation mat of the inside layer is attached to a first side of the scrim; and
c) an intermediate layer configured between the inside layer and the outside layer, and comprising high temperature fibers, wherein the average diameter of said high temperature fibers of the intermediate layer are smaller in diameter than the average diameter of the high temperature fibers of the inside layer;
wherein the average diameter of the high temperature fibers of the inside layer is at least 20% greater than an average diameter of the high temperature fibers of the outside layer, thereby producing a gradient in fiber diameter from the inside layer to the outside layer;
wherein the high temperature flexible insulation has optical properties to produce a transmittance of no more than 5% over a range of temperature from 500° C. to 5000° C.; and
wherein said gradient of fiber diameters enables each of the inside layer and the outside layer to have an emittance and refractive index that corresponds to a gradient in temperature through the high temperature flexible insulation from the outside layer to the inside layer.

* * * * *